United States Patent [19]

Clifford

[11] 4,296,942
[45] Oct. 27, 1981

[54] EMERGENCY RELEASE SYSTEMS

[75] Inventor: Roy Clifford, Ampthill, England

[73] Assignee: Kangol Magnet Limited, Carlisle, England

[21] Appl. No.: 79,235

[22] Filed: Sep. 26, 1979

Related U.S. Application Data

[63] Continuation of Ser. No. 893,418, Apr. 4, 1978.

[30] Foreign Application Priority Data

Apr. 18, 1975 [GB] United Kingdom ............... 16198/75

[51] Int. Cl.³ ............................................. B60R 21/10
[52] U.S. Cl. ..................................... 280/803; 280/807
[58] Field of Search ................ 280/802, 803, 807, 808

[56] References Cited

U.S. PATENT DOCUMENTS 2,775,288 12/1956 Anastasia ............................ 280/802
3,917,019 11/1975 Pearson ................................ 280/803
4,004,821 1/1977 Breitschwerdt .................... 280/803

Primary Examiner—Robert R. Song
Attorney, Agent, or Firm—Young & Thompson

[57] ABSTRACT

A vehicle seat belt system includes a release mechanism rendering the system ineffective to retain the user in his seat. The mechanism is operable to move the locking mechanism of an acceleration responsive retractor to the unlocked position in response to the opening of a vehicle door, so that where the seat belt system is passive, the occupant is automatically released when the door is opened regardless of whether or not the retractor is locked. In a passive seat belt system, another emergency release mechanism permits manual release of the belt from an anchorage position in an emergency, either by the occupant or from outside the vehicle.

5 Claims, 8 Drawing Figures

EMERGENCY RELEASE SYSTEMS

This is a continuation of application Ser. No. 893,418, filed Apr. 4, 1978.

The invention relates generally to vehicle safety belt systems and in specifically to emergency release mechanisms for such systems.

In some kinds of vehicle safety belt systems, an acceleration responsive locking retractor is mounted on or within the vehicle door. An example is a passive seat belt system, that is, a system in which the belt is applied to the occupant of a vehicle seat automatically as a consequence of his occupying it. In an accident, the vehicle position may be such as to hold the retractors in locked condition, so that the belt restrains the occupant in his seat and prevents full opening of the door.

The invention accordingly has as an object the provision of a mechanism arranged to ensure that a retractor carried by a vehicle door cannot remain in a locked condition whilst the door is open at least by more than a small amount. Since an acceleration responsive retractor must normally respond to vehicle acceleration (which term is herein used to include deceleration) in any horizontal direction, and/or to belt withdrawal at more than a predetermined rate, the opening or closing of the door on which it is mounted is likely to lock the retractor against belt withdrawal, so interfering with the operation of the system, and the mechanism of the invention functions also to inhibit locking of the retractor, if unlocked, whilst the door is open. The mechanism of the invention facilitates speedy exit from a vehicle in an emergency, because all that is necessary to effect release of the seat belt is to open the door, a natural action on the part of an occupant of the vehicle or a rescuer outside it. Such an emergency release mechanism includes no means whereby the passive nature of a passive system can be defeated. The belt is released in an emergency without any special knowledge or action being required either of the occupant or a rescuer outside the vehicle.

In some accident conditions, the vehicle will be in a position in which the door mounting the retractor of a passive seat belt system cannot be opened at all, for example because the vehicle is lying on its side. The or each occupant will then be restrained by his belt.

It is therefore a further object of the invention to provide a passive seat belt system incorporating selectively operable emergency release means for enabling the occupant or occupants of the system to escape the restraint of the belt.

The invention thus also provides a passive seat belt system for a pair of seats located side by side, the system comprising belt means extending from retractors diagonally downwardly from position at the outer sides of the seats at about the level of the face or neck of occupants thereof of a lower central position between the seats from which the belt means can be released by an occupant of the vehicle and/or by a person outside it.

Objects and advantages of the present invention will be understood from the following description, which is given by way of example only. In the drawings referred to in the description:

Figure 1:
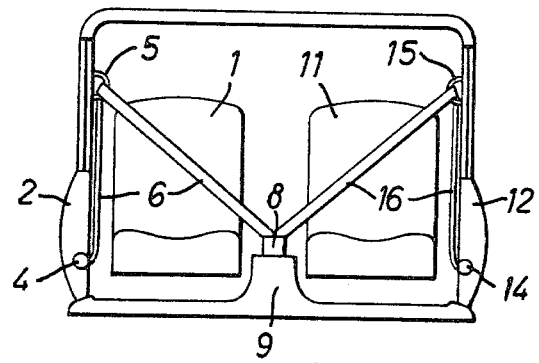
FIG. 1 is a schematic sectional front view of adjacent seats in a motor vehicle with which is associated a passive seat belt system incorporating emergency release means in accordance with the invention.
Figure 2:
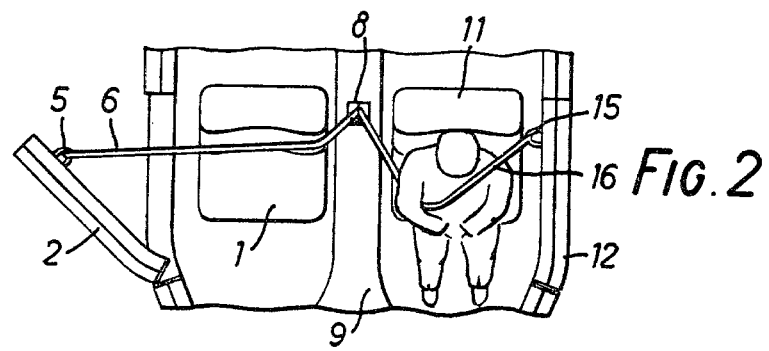
FIG. 2 is a schematic plan view of the seats and seat belt system of FIG. 1.

FIGS. 1 and 2 show two seats 1, 11 arranged side by side in a motor vehicle, for example the driver and passenger seats in a car. Access to each seat is gained by an adjacent front hinged door 2, 12. At the base of the upright free edge at the rear of each door there is mounted a seat belt retractor 4, 14. The retractors 4, 14 may be external of the door structure or contained substantially within it as shown. At the top of the free edge of the door is mounted a running loop 5, 15. Belts 6, 16 extend from the retractors 4, 14 respectively upwardly to the associated running loops 5, 15 and thence to a common anchorage position 8 on a transmission tunnel 9 between the seats 1, 11.

As may be seen by reference to the left hand side of FIG. 2 in which the door 2 is shown in the open position, a person entering the vehicle to occupy the seat 1 will place himself between the seat back and the portion of the belt 6 which extends between the loop 5 and the anchorage 8. On closure of the door behind him, the loop 5 is carried rearwardly so as to extend around the passenger in the manner shown in the right hand side of FIG. 2. The retractors 4, 14 are arranged to lock against belt withdrawal in the event of undue acceleration of the vehicle and/or the belt as would occur for example in a collision, and the passenger is consequently held in his seat against damaging impact with the vehicle interior.

The retractors 4, 14 are essentially similar and only the retractor 4 will be described in any detail with reference to later Figures.

The retractor 4 has a main spindle 20 urged by a spring 21 to rotate in a direction such as to wind the belt 6 up onto the spindle. The belt 6 can be withdrawn against the force of this rewind spring 21 in use. The retractor 4 includes an acceleration sensing mechanism and a locking mechanism to prevent such withdrawal in the event of an accident.

The locking mechanism comprises a locking bar 24 pivotably mounted in section shaped apertures 25 in side plates 26 of the retractor for locking movement from a normal or rest position in which the bar is spaced from the teeth 28 of a ratchet wheel or wheels 29 secured to rotate with the spindle 20. The bar 24 can move to the locking position shown in broken lines by tilting about a pivot axis at the apices of the apertures 25 which is parallel to one longer edge of the bar. The bar 24 then has the other longer edge in engagement with the ratchet teeth 28, and rotation of the spindle 20 in the belt unwinding direction is prevented.

The locking bar 24 is pivoted from the rest position to the locking position by the acceleration sensing mechanism which is responsive to acceleration (in which expression deceleration is included) of the vehicle.

The acceleration sensing mechanism illustrated comprises an inertia weight or pendulum, 30 suspended by a stem 31 extending upwardly therefrom through an apertured fixed support 32 to a plate 34 which underlies the locking bar 24 and which rests on the support around the aperture. In the event of a sharp deceleration of the vehicle, the pendulum pivots on the support 32, the consequent tilting of the plate pivoting the locking bar from its rest to its locking position. The acceleration sensitive mechanism as described is sensitive to vehicle acceleration only but could be sensitive to belt acceleration, that is, responsive to a sharp pull on the belt, additionally or instead.

It will be understood that the passive seat belt configuration and the locking and acceleration sensitive mechanisms described are merely illustrative of such mechanisms and could readily be replaced by alternatives.

Figure 4:
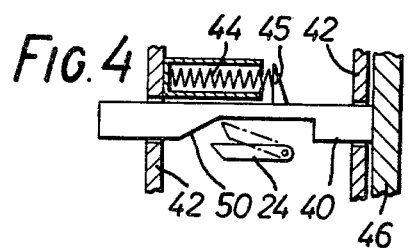
FIGS. 4 and 5 are schematic side views of the emergency release means associated with the retractor of FIG. 3 respectively in the inoperative and operative positions.
Figure 5:
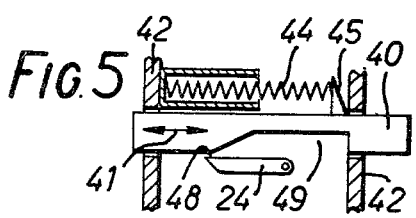

In accordance with the invention, a mechanism illustrated in FIGS. 4 and 5 is provided which, on opening of the door 2, will effect unlocking of the retractor 4, if locked, and will prevent locking of the retractor, if unlocked. The mechanism comprises an elongated element 40 which is carried by the door or directly on the structure of the retractor to overlie the locking bar 24 or an extension thereof outside the region of the ratchet wheel or wheels. The element 40 is guided for horizontal sliding movement indicated by the arrows 41 in a guideway 42 fixed on the retractor of the door as shown. A compression spring 44 is trapped between the guideway 42 and an abutment 45 on the element 40.

Figure 3:
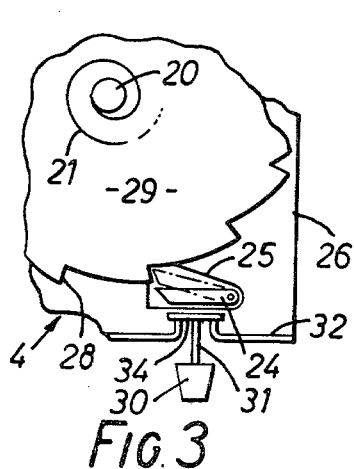
FIG. 3 is a schematic partial side view of a door mounted retractor included in the seat belt system of FIGS. 1 and 2.

In the closed position of the door, shown in FIG. 4, the element 40 is urged by the spring 44 into engagement with a fixed part of the vehicle, suitably a portion 46 of the door frame. When the door is opened, the mechanism is carried with it away from the door frame portion 46, and the element 40 moves under the pressure of the spring 44 to maintain abutment with the door frame portion 46 until the abutment 45 limits this movement by contact with the guideway 42 and the element separates from the door frame portion. In this inhibit position, shown in FIG. 5, a lower surface portion 48 of the element 40 directly overlies the locking bar 24, so that this is no longer free to pivot into its locking position as shown in FIG. 3. The element 40 however has a recess 49 in its undersurface which overlies the locking bar 24 when the element is in the position shown in FIG. 3, the recess permitting the bar to pivot into its locking position.

To be operative to release the user of the belt system after an accident, the mechanism must be able to move the locking bar 24 from the locked position to the unlocked position as a consequence of the door opening movement. Between the surface portion 48 and recess 49, the element 40 has an inclined surface 50 which operates as a cam for causing the bar to pivot to the unlocking position.

Suppose now the situation to be as illustrated in FIG. 4, except that as the consequence of an accident the locking bar 24 has been pivoted upwardly as indicated in broken lines in FIG. 3 and is held in this position because of the attitude of the vehicle or by its engagement with the ratchet teeth 28. On opening of the door, the element 40 moves from the position of FIG. 4 to that of FIG. 5 and the cam surface 50 forces the locking bar to pivot back to its rest position.

Figure 6A:
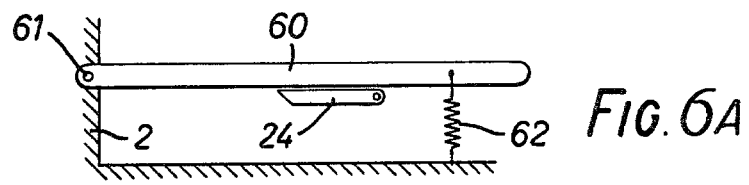
FIG. 6 is a like view of a modified form of an emergency release means shown in the operative position.
Figure 6B:
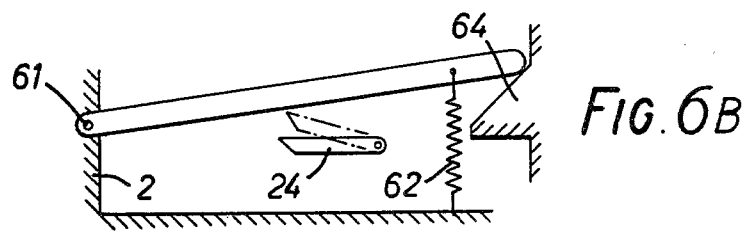

A second emergency release mechanism in accordance with the invention is illustrated in FIG. 6. This second mechanism is shown in FIG. 6A in the inhibit position, with the door open. An arm 60 has one end pivoted on the door 2 as shown on directly on the retractor structure at a pivot axis 61 and in this position the arm extends generally horizontally in overlying relationship with the locking bar 24, so prevent locking movement. A tension spring 62 extends from a position on the arm on the far side of the locking bar 24 from the pivot axis 61 to a fixed position on the door 2. To permit normal operation of the locking bar 24, a cam portion 64 which is fixed with respect to the vehicle, forming for example part of the door frame causes pivotation of the arm 60 against the tension of the spring 62, on closure of the door, sufficient to free the locking bar to move to the locked position as shown in broken lines in FIG. 6B.

On opening of the door, the spring 62 pulls the arm 60 back to the position shown in FIG. 6A, to restrain the locking bar 24 against locking movement if it is in the rest position, and to return it to the rest position if it is in the locked position.

The locking bar 24 is preferably located as near to the pivot axis 61 and as far from the spring 62 as possible so that the spring force is applied to the arm with mechanical advantage.

The mechanism of FIGS. 4 and 5 or that of FIG. 6 thus provides for emergency release of the seat belt system and also for inhibiting locking of the retractor when the door is open say by more than a few degrees. It will be appreciated that such an emergency release mechanism can be readily applied to locking mechanisms different from that of FIG. 3. The mechanism is not limited in its application to passive seat belt systems or to door-mounted retractors. The arrangements shown can be readily reversed so that a retractor mounted say on a door pillar or frame cannot lock or be locked when the door is opened.

Figure 7:
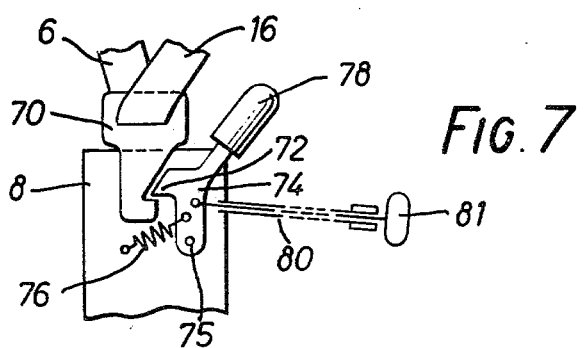
FIG. 7 is a schematic side view of a second emergency release means incorporated in the seat belt system of FIGS. 1 and 2.

The passive seat belt system shown in FIGS. 1 and 2 can include a second emergency release mechanism, as shown in FIG. 7, instead of or in addition to that described with reference to FIGS. 4 and 5 or FIG. 6. This second mechanism allows a connector for the belts at the anchorage 8 to be released from the anchorage, or the belts to be released from the connector, in an emergency by an occupant of one of the seats or a person outside the vehicle.

As shown in FIG. 7, the anchorage 8 comprises a releasable two part buckle having a tongue portion 70 to which are connected the ends of the belts 6, 16. Alternatively, the tongue portion can have an aperture to receive freely therethrough a single length of belt when the belts 6, 16 are so constituted. The tongue portion 70 has a recess at one side to receive a nose portion 72 of a catch member 74 pivoted about a pivot 75 in the anchorage. A tension spring 76 extends between the catch member and the anchorage so as to urge the nose portion 72 into the recess. In the position shown therefor, the belt ends are securely held at the anchorage 8.

In an emergency requiring release of the belts 6, 16 to make it possible for the seat occupant or occupants, the catch member 74 can be manually pivoted away from the tongue portion 70. The catch member 74 is provided with a handle 78 for this purpose. The retractors 4, 14 acting on the ends of the belts will pull these together with the tongue portion 70 from the normal position shown in FIG. 1 to a release position in which the belts extends across the seats 1, 11 at about head height.

Although the simple buckle release at the centre position proposed above is convenient, in that it allows release by an occupant, it is possible to provide for release externally of the vehicle either instead or in addition. Thus as shown in FIG. 7, an elongated connection member 80 for example a Bowden cable or simply a chain or mechanical linkage has one end connected to the catch member 74 and the other end to a handle 81 located externally of the vehicle at any convenient position. A pull on the handle 81 will release the tongue portion 70 in just the same way as pivotation of the catch member 74 directly by use of the handle 78.

The provision of the releasable buckle at the centre anchorage 8 of course provides the possibility of misuse of the system, in that its passive nature is evaded if the buckle is released in normal circumstances. However, release once the occupant or occupants are seated would cause the belt to assume a position across the face of the or each occupant, which would impose considerable inconvenience. If instead the released belt is placed behind the seat, exit and entry through the doors becomes at the very least extremely difficult. The system is thus designed to be more convenient in use than when released, so that use in the manner intended is ensured, without complicated means such as door or seat switch interlocks.

It will be evident that the double system described for use in connection with seats 1 and 11 can be replaced by two independent systems each associated with a respective seat.

The invention can of course be embodied in emergency release mechanisms and in passive seat belt systems differing in a variety of ways from those illustrated and described.

I claim:

1. A vehicle comprising:
two separate vehicle seats located in said vehicle in adjacency,
two passive seat belt systems each associated with a respective one of said vehicle seats, each system being adapted to occupy either a position of use or an out of use position in dependence on a vehicle condition and comprising a seat belt means extending in the position of use across the associated seat, connector means adapted to releasably connect both said seat belt means together to said vehicle at a position between said seats, said connector means being manually operable by a single operation to effect disconnection of said seat belt means from said vehicle to render both said seat belt systems incapable of restraining the occupants of the seats therein, each of said seat belt systems comprising a retractor having a retractor spring, said seat belt means being withdrawable from said retractor against the pull of said spring, said seats being located between two vehicle doors and the retractor of each of said seat belt systems being mounted on the one of said doors adjacent the associated seat, and a guide means for said seat belt means carried by each of said doors at a position above the associated retractor at about the level of the faces of the occupants of the seats, each of said belts extending upwardly from said retractor to said guide means and diagonally downwards from said guide means to said connector means, whereby said seat belt means extend across and above said seats in front of the faces of the occupants on release of the seat belt means from said connection means.

2. The vehicle of claim 1 wherein said seat belt means are constituted by a single length of belt.

3. The vehicle of claim 1 wherein each of said seat belt means is adapted to occupy either the position of use or the out of use position in dependence on whether the adjacent door is in the closed or the open position thereof.

4. The vehicle of claim 1 wherein means is provided for manual operation of said connector means to effect said disconnection from a position located externally of said vehicle.

5. The vehicle of claim 2 wherein said connector means comprises a connection member, the connection member having a tongue and an aperture through which said single length of belt freely extends, socket means, said socket means releasably receiving said tongue therein to connect said connection member to said vehicle, and release means, said release means being operable to effect release of said tongue from said socket.

* * * * *